W. R. M. VERY.
SPARE WHEEL CARRIER FOR MOTOR CARS.
APPLICATION FILED NOV. 10, 1915.
1,249,564.
Patented Dec. 11, 1917.
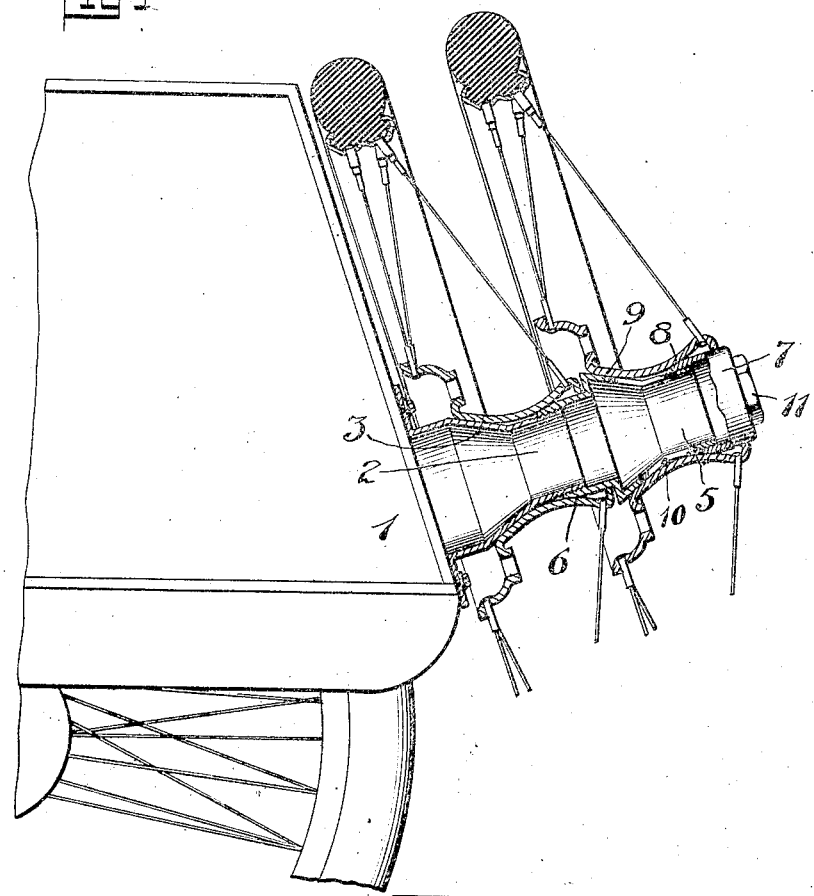
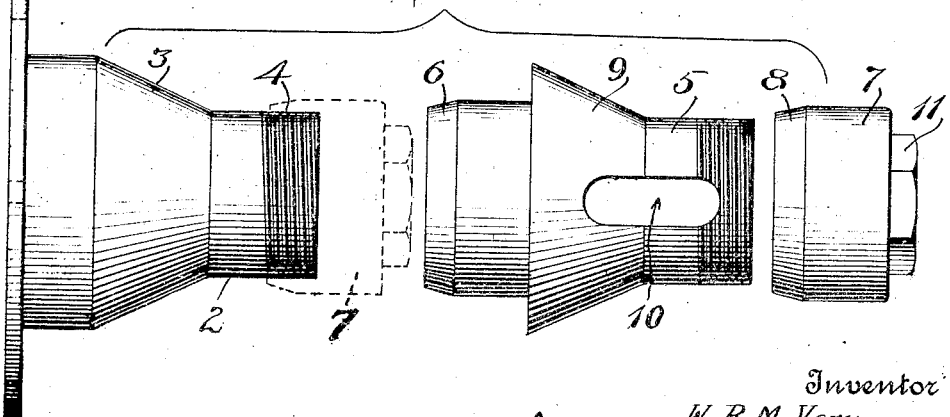
Inventor
W. R. M. Very
By his Attorneys

UNITED STATES PATENT OFFICE.

WILLIAM R. M. VERY, OF NEW ROCHELLE, NEW YORK.

SPARE-WHEEL CARRIER FOR MOTOR-CARS.

1,249,564.

Specification of Letters Patent. Patented Dec. 11, 1917.

Application filed November 10, 1915. Serial No. 60,700.

*To all whom it may concern:*

Be it known that I, WILLIAM R. M. VERY, a citizen of the United States of America, residing at New Rochelle, New York, have invented a new and useful Spare-Wheel Carrier for Motor-Cars, of which the following is a specification.

My invention relates to an improved wheel holding device useful for carrying spare wheels on a motor car. In the particular form shown, the device is especially designed for the carrying of spare wheels of the wire spoke variety, although it is not necessarily limited to such use. By my improved construction it is possible to carry one or more wheels with entire safety and security.

In the drawings:

Figure 1 illustrates the rear end of a motor car with my improvement shown in longitudinal section thereon in operative position.

Fig. 2 is a side elevation relatively enlarged, of my improved wheel carrying device, several elements being separated for clear illustration.

1 may represent in this instance the back of the body of an automobile since that constitutes one convenient and easily accessible place for carrying spare wheels. Suitably mounted upon this back is a fixed spindle 2 having at its base a suitable abutment 3. The outer end of the spindle 2 is suitably formed to receive a locking device. In this instance the outer end is threaded as at 4 for this purpose. 5 is a combined locking device and wheel carrying spindle constituting a removable extension of the first by which the first wheel may be locked in place and by which a second wheel may be supported. This element 5 is, in this instance, threaded to screw onto the threaded end 4 of the spindle 2 and said lock may be provided with the abutment shoulder 6 so as to force the hub of the first wheel securely into the position in which it is to be carried, the said first wheel being held between abutments 3 and 6. The outer end of the locking element 5 is suitably shaped or threaded to receive an outside locking device which is designed to hold the second wheel on the member 5. It is preferable that the outer end of the part 5 should be shaped or threaded to correspond with the threaded outer end of the part 4 for the reasons later set forth. 7 is an outside locking member having the outside abutment 8 while 9 is an abutment on the element 5 corresponding generally or specifically to the abutment 3 so that a second wheel may be held between the abutments 8 and 9 in the same manner that the first wheel is held between the abutments 3 and 6. Should it be desired to carry only one wheel the combined locking member and spindle element 5 could be removed from the spindle 2 and the outside locking member 7 could be screwed on to the end 4 of said spindle 2 so as to hold the single wheel in place, the combined lock and spindle 5 being temporarily laid to one side. Any suitable means may be provided to facilitate the screwing up or unscrewing of the parts 5 and 7. For example, the part 5 may have a transverse passage 10 through which a bar may be passed to enable it to be screwed tightly into place. The outside locking member may have its outer end shaped like a nut as indicated at 11 to receive an ordinary wrench. Such details, however, may be modified in a variety of ways, the particular improvement upon which my invention depends comprising the combined wheel lock and spindle element 5 which is preferably so constructed that it may be used at will between the fixed spindle 2 and the outside locking member 7 whenever it is desired to carry a second wheel.

What I claim is:

1. In a wheel carrying device, a fixed spindle arranged to pass through the hub of a wheel, a substantially corresponding extension spindle screw threaded thereon, with abutments on said parts for engaging and holding a wheel positioned on the fixed spindle, a removable locking device on the extension spindle with coöperating abutments on said removable locking device and extension spindle respectively for holding a second wheel on said extension spindle.

2. In a wheel carrying device, a fixed spindle arranged to pass through the hub of a wheel, a substantially corresponding extension spindle screw threaded thereon, with abutments on said parts for engaging and holding a wheel positioned on the fixed spindle, a removable locking device on the extension spindle with coöperating abutments on said removable locking device and extension spindle respectively for holding a second wheel on said extension spindle, said removable locking device being screw threaded on said extension spindle, the screw threads corresponding to the screw threads on the fixed spindle whereby said locking device may be interchangeably employed on the end of the fixed spindle or on the end of the extension spindle.

3. In a wheel carrying device, a fixed spindle arranged to pass through the hub of a wheel, a substantially corresponding extension spindle screw threaded thereon with oppositely inclined abutments on said parts for engaging and holding a wheel positioned on the fixed spindle, a removable locking device on the extension spindle with oppositely inclined coöperating abutments on said removable locking device and extension spindle respectively for holding a second wheel on said extension spindle.

4. In a wheel carrying device, a fixed spindle arranged to pass through the hub of a wheel, a substantially corresponding extension spindle screw threaded thereon with oppositely inclined abutments on said parts for engaging and holding a wheel positioned on the fixed spindle, a removable locking device on the extension spindle with oppositely inclined coöperating abutments on said removable locking device and extension spindle respectively for holding a second wheel on said extension spindle, said locking device being interchangeably adaptable to the end of the extension spindle or the end of the fixed spindle at will.

WILLIAM R. M. VERY.